(12) United States Patent
Braunreiter et al.

(10) Patent No.: US 8,652,599 B2
(45) Date of Patent: Feb. 18, 2014

(54) MOLDED THREE-DIMENSIONAL INSULATOR

(75) Inventors: Carl J. Braunreiter, Prescott, WI (US); Javier E. Gonzalez, Oakdale, MN (US); Michael Patrick M. Mandanas, Maplewood, KS (US)

(73) Assignee: 3M Innovative Properties Company, Saint Paul, MN (US)

( * ) Notice: Subject to any disclaimer, the term of this patent is extended or adjusted under 35 U.S.C. 154(b) by 1684 days.

(21) Appl. No.: 10/540,242

(22) PCT Filed: Jan. 22, 2004

(86) PCT No.: PCT/US2004/001977
§ 371 (c)(1),
(2), (4) Date: Jun. 22, 2005

(87) PCT Pub. No.: WO2004/064996
PCT Pub. Date: Aug. 5, 2004

(65) Prior Publication Data
US 2006/0070554 A1    Apr. 6, 2006

Related U.S. Application Data

(60) Provisional application No. 60/441,664, filed on Jan. 22, 2003, provisional application No. 60/456,736, filed on Mar. 21, 2003.

(51) Int. Cl.
*F16L 9/10*      (2006.01)
*C04B 14/38*     (2006.01)
*B29C 51/10*     (2006.01)

(52) U.S. Cl.
USPC .................. 428/34.5; 106/711; 264/87

(58) Field of Classification Search
USPC ........ 428/36.1, 34.4, 34.5; 106/711; 264/102, 264/87; 174/73.1, 209
See application file for complete search history.

(56) References Cited

U.S. PATENT DOCUMENTS

| | | | |
|---|---|---|---|
| 3,166,467 | A | 1/1965 | Reifers et al. |
| 3,250,833 | A | 5/1966 | Wagner |
| 3,458,329 | A | 7/1969 | Owens et al. |
| 3,488,723 | A | 1/1970 | Veazie |
| 3,655,863 | A | 4/1972 | Andersen et al. |

(Continued)

FOREIGN PATENT DOCUMENTS

| | | |
|---|---|---|
| DE | 2 300 982 | 7/1974 |
| DE | 2 314 465 | 10/1974 |

(Continued)

OTHER PUBLICATIONS

Howitt, John S. & Montierth, Max R., "Cellular Ceramic Diesel Particulate Filter," Society of Automotive Engineers, Inc., 1981, pp. 1-9, 810114.

(Continued)

*Primary Examiner* — Erik Kashnikow

(57) ABSTRACT

This invention provides a molded three-dimensional insulator that is suitable for use in an end cone region of a pollution control device. The invention also provides a method of making the insulator. The insulator includes ceramic fibers that have a bulk shrinkage no greater than 10 weight percent. The ceramic fibers contain alumina and silica and are microcrystalline, crystalline, or a combination thereof.

20 Claims, 2 Drawing Sheets

(56) References Cited

U.S. PATENT DOCUMENTS

| | | | |
|---|---|---|---|
| 3,801,289 A | 4/1974 | Wiley | |
| 3,891,396 A | 6/1975 | Musall et al. | |
| 3,916,057 A | 10/1975 | Hatch et al. | |
| 3,940,244 A * | 2/1976 | Sauder et al. | 432/247 |
| 3,975,565 A | 8/1976 | Kendall | |
| 3,990,859 A | 11/1976 | Waite | |
| 3,996,145 A | 12/1976 | Hepburn | |
| 4,002,433 A | 1/1977 | Oser | |
| 4,011,651 A | 3/1977 | Bradbury et al. | |
| 4,181,514 A | 1/1980 | Lefkowitz et al. | |
| 4,282,905 A * | 8/1981 | Dopkin et al. | 138/125 |
| 4,305,992 A | 12/1981 | Langer et al. | |
| 4,376,675 A | 3/1983 | Perrotta | |
| 4,378,046 A | 3/1983 | Klinger | |
| 4,385,135 A | 5/1983 | Langer et al. | |
| 4,431,449 A | 2/1984 | Dillon et al. | |
| 4,534,886 A | 8/1985 | Kraus et al. | |
| 4,598,790 A | 7/1986 | Uesugi et al. | |
| 4,624,820 A | 11/1986 | Barraclough | |
| 4,693,338 A | 9/1987 | Clerc | |
| 4,865,818 A | 9/1989 | Merry et al. | |
| 4,927,608 A | 5/1990 | Worner et al. | |
| 4,929,429 A | 5/1990 | Merry | |
| 4,950,627 A | 8/1990 | Tokarz et al. | |
| 4,954,462 A | 9/1990 | Wood et al. | |
| 4,999,168 A | 3/1991 | Ten Eyck | |
| 5,008,086 A | 4/1991 | Merry | |
| 5,024,289 A | 6/1991 | Merry | |
| 5,028,397 A | 7/1991 | Merry | |
| 5,078,822 A | 1/1992 | Hodges et al. | |
| 5,151,253 A | 9/1992 | Merry et al. | |
| 5,190,610 A | 3/1993 | Ek | |
| 5,242,871 A | 9/1993 | Hashimoto et al. | |
| 5,250,269 A * | 10/1993 | Langer | 422/179 |
| 5,254,410 A | 10/1993 | Langer et al. | |
| 5,290,522 A | 3/1994 | Rogers et al. | |
| 5,332,609 A | 7/1994 | Corn | |
| 5,380,580 A | 1/1995 | Rogers et al. | |
| 5,404,716 A | 4/1995 | Wells et al. | |
| 5,408,828 A | 4/1995 | Kreucher et al. | |
| 5,419,127 A | 5/1995 | Moore, III | |
| 5,523,059 A | 6/1996 | Langer | |
| 5,609,934 A | 3/1997 | Fay | |
| 5,693,274 A | 12/1997 | Kim | |
| 5,736,109 A | 4/1998 | Howorth et al. | |
| 5,853,675 A | 12/1998 | Howorth | |
| 6,010,668 A * | 1/2000 | Lawrence et al. | 422/176 |
| 6,051,193 A | 4/2000 | Langer et al. | |
| 6,444,600 B1 * | 9/2002 | Baek et al. | 501/95.1 |
| 6,551,535 B2 | 4/2003 | Sander | |
| 6,596,120 B2 | 7/2003 | Davis et al. | |
| 6,613,296 B1 * | 9/2003 | Myers et al. | 422/179 |
| 6,726,884 B1 | 4/2004 | Dillon et al. | |
| 6,923,942 B1 | 8/2005 | Shirk et al. | |
| 2002/0025904 A1 | 2/2002 | Goto et al. | |
| 2003/0086832 A1 | 5/2003 | Turek | |
| 2003/0091479 A1 | 5/2003 | Kircanski | |
| 2003/0185725 A1 | 10/2003 | Mutou et al. | |
| 2003/0205284 A1 | 11/2003 | Davis et al. | |
| 2004/0234436 A1 | 11/2004 | Howorth | |

FOREIGN PATENT DOCUMENTS

| | | |
|---|---|---|
| DE | 25 49 255 A1 | 5/1977 |
| DE | 34 32 283 A1 | 3/1986 |
| DE | 36 26 728 A1 | 2/1988 |
| DE | 37 00 070 A1 | 7/1988 |
| DE | 38 30 352 C1 | 11/1989 |
| DE | 0 352 246 | 1/1990 |
| DE | 38 35 841 A1 | 4/1990 |
| EP | 0 413 998 A1 | 2/1991 |
| EP | 0 573 834 A1 | 12/1993 |
| EP | 0 573 834 B1 | 12/1993 |
| EP | 0 643 204 A2 | 3/1995 |
| EP | 0 692 616 | 1/1996 |
| FR | 2 703 105 | 9/1994 |
| GB | 1 488 649 | 10/1977 |
| GB | 2 143 902 A | 2/1985 |
| GB | 2 171 180 A | 8/1986 |
| JP | 61-89916 | 5/1986 |
| JP | 2-61313 | 3/1990 |
| JP | 11-117731 | 4/1999 |
| WO | WO 91/19081 | 12/1991 |
| WO | WO 97/48890 A1 | 12/1997 |
| WO | WO 98/50688 | 11/1998 |
| WO | WO 99/46028 | 9/1999 |
| WO | WO 00/11098 | 3/2000 |
| WO | WO 00/75496 A1 | 12/2000 |
| WO | WO 02/04167 A1 | 1/2002 |

OTHER PUBLICATIONS

Brunner, Nathan, "Catalytic Converter Hot Vibration Test Methods at The 3M Company," SAE International, 2004, 2004-01-0146.

Pending U.S. Appl. No. 09/328,065, Langer, filed Jun. 8, 1999.

ICI Chemicals & Polymers Limited, "Catalytic Converters—Refractory Fibre Retaining Blankets US 4,693,338 Validity", M. Dee, Sep. 27, 1994, p. 1-4.

Smook et al., Handbook for Pulp & Paper Technologists, pp. 218-225 (1982).

Product Literature: The Carborundum Company, FIBERFRAX® Felt Products, 1990, pp. 1-4.

Product Literature: Thermal Ceramics Transportation, Heat Shields for Thermal Management, "Kaoset Moldable Felts," (Undated).

\* cited by examiner

MOLDED THREE-DIMENSIONAL INSULATOR

CROSS REFERENCE TO RELATED APPLICATIONS

This application claims priority to U.S. Provisional Patent Application No. 60/441,664 filed Jan. 22, 2003 and U.S. Provisional Patent Application No. 60/456,736 filed on Mar. 21, 2003.

FIELD OF THE INVENTION

A molded three-dimensional insulator and a method of making the insulator are provided. More specifically, a molded three-dimensional insulator for use in an end cone region of a pollution control device is provided.

BACKGROUND OF THE INVENTION

Pollution control devices are used on motorized vehicles to reduce atmospheric pollution. Two types of pollution control devices are currently in widespread use: catalytic converters and diesel particulate filters or traps. Catalytic converters contain one or more catalysts, which are typically coated onto a substrate in the form of a monolithic structure. The monolithic structures are usually ceramic, although metal monoliths have been used. The catalyst(s) can oxidize carbon monoxide, oxidize various hydrocarbons, reduce the oxides of nitrogen, or a combination thereof in exhaust gases. Diesel particulate filters or traps are typically in the form of wall flow filters having a honeycombed monolithic structure made from permeable crystalline ceramic materials. Alternate cells of the honeycombed monolithic structure are plugged so that the exhaust gas enters one cell, flows through the permeable wall into another cell, and then exits the structure.

In state-of-the-art constructions of these pollution control devices, the monolithic structure is enclosed within a end cone housing. Because the monolithic structure typically has a larger diameter than an exhaust pipe from a vehicle, the end cone housing typically includes a transition zone. This transition zone, referred to as the end cone region, narrows from a diameter suitable for the monolithic structure to a diameter suitable for connection to an exhaust pipe. The end cone is usually conical in shape and can be provided on both the inlet and outlet side of the pollution control device.

Pollution control devices are usually operated at a relatively high temperature such as, for example, above about 500° C. Consequently, insulation is typically provided within the end cone housing. Insulation material in the form of a mounting mat can be placed between the monolithic structure and the metal housing. Insulation can also be placed in the end cone region of the end cone housing. The end cone region typically has a double-wall construction that includes an outer end cone housing and an inner end cone housing. Insulation material can be placed between the inner and outer end cone housings.

SUMMARY OF THE INVENTION

This invention provides a molded three-dimensional insulator. More specifically, the insulator is suitable for use in an end cone region of a pollution control device. The invention also provides a method of making the insulator.

One aspect provides an article that includes a molded three-dimensional insulator having dimensions suitable for use in an end cone region of a pollution control device. The insulator includes ceramic fibers having a bulk shrinkage no greater than 10 percent using a Thermal Mechanical Analyzer test (i.e., a sample of the ceramic fibers, under a load of about 50 psi (345 kN/m$^2$), is heated to 1000° C. and then cooled; the caliper of the sample at 750° C. during the heating step is compared to the caliper of the sample at 750° C. during the cooling step). The insulator is self-supporting, seamless, and has a compressibility value no greater than 750 kN/m$^2$ when the mount density is about 0.4 g/ml. The article can further include an end cone housing for a pollution control device attached to an inner surface of the insulator, an outer surface of the insulator, or a combination thereof.

A second aspect of the invention also provides an article that includes a molded three-dimensional insulator having dimensions suitable for use in an end cone region of a pollution control device. The insulator includes ceramic fibers that contain at least 20 weight percent alumina and at least 30 weight percent silica based on the weight of the fibers. The ceramic fibers can be microcrystalline, crystalline, or a combination thereof. The insulator is self-supporting, seamless, and has a compressibility value no greater than 750 kN/m$^2$ when the mount density is about 0.4 g/ml. The article can further include an end cone housing for a pollution control device attached to an inner surface of the insulator, an outer surface of the insulator, or a combination thereof.

A third aspect of the invention provides a method of making an article that includes an insulator suitable for use in an end cone region of a pollution control device. The method involves preparing an aqueous slurry, vacuum forming a molded three-dimensional preform from the aqueous slurry on a permeable forming die, and drying the preform to produce the molded three-dimensional insulator. The aqueous slurry used to prepare the preform includes ceramic fiber having a bulk shrinkage no greater than 10 percent based on the Thermal Mechanical Analyzer test. The insulator is self-supporting and has a compressibility value no greater than 750 kN/m$^2$ when the mount density is about 0.4 g/ml.

A fourth aspect of the invention provides a method of making an article that includes an insulator suitable for use in an end cone region of a pollution control device. The method involves preparing an aqueous slurry, vacuum forming a molded three-dimensional preform from the aqueous slurry on a permeable forming die, and drying the preform to produce the molded three-dimensional insulator. The aqueous slurry used to prepare the preform includes ceramic fiber that contain at least 20 weight percent alumina and at least 30 weight percent silica. The ceramic fibers can be microcrystalline, crystalline, or a combination thereof. The insulator is self-supporting and has a compressibility value no greater than 750 kN/m$^2$ when the mount density is about 0.4 g/ml.

The above summary of the present invention is not intended to describe each disclosed embodiment or every implementation of the present invention. The Figures and the detailed description that follow more particularly exemplify these embodiments.

Figure 1:
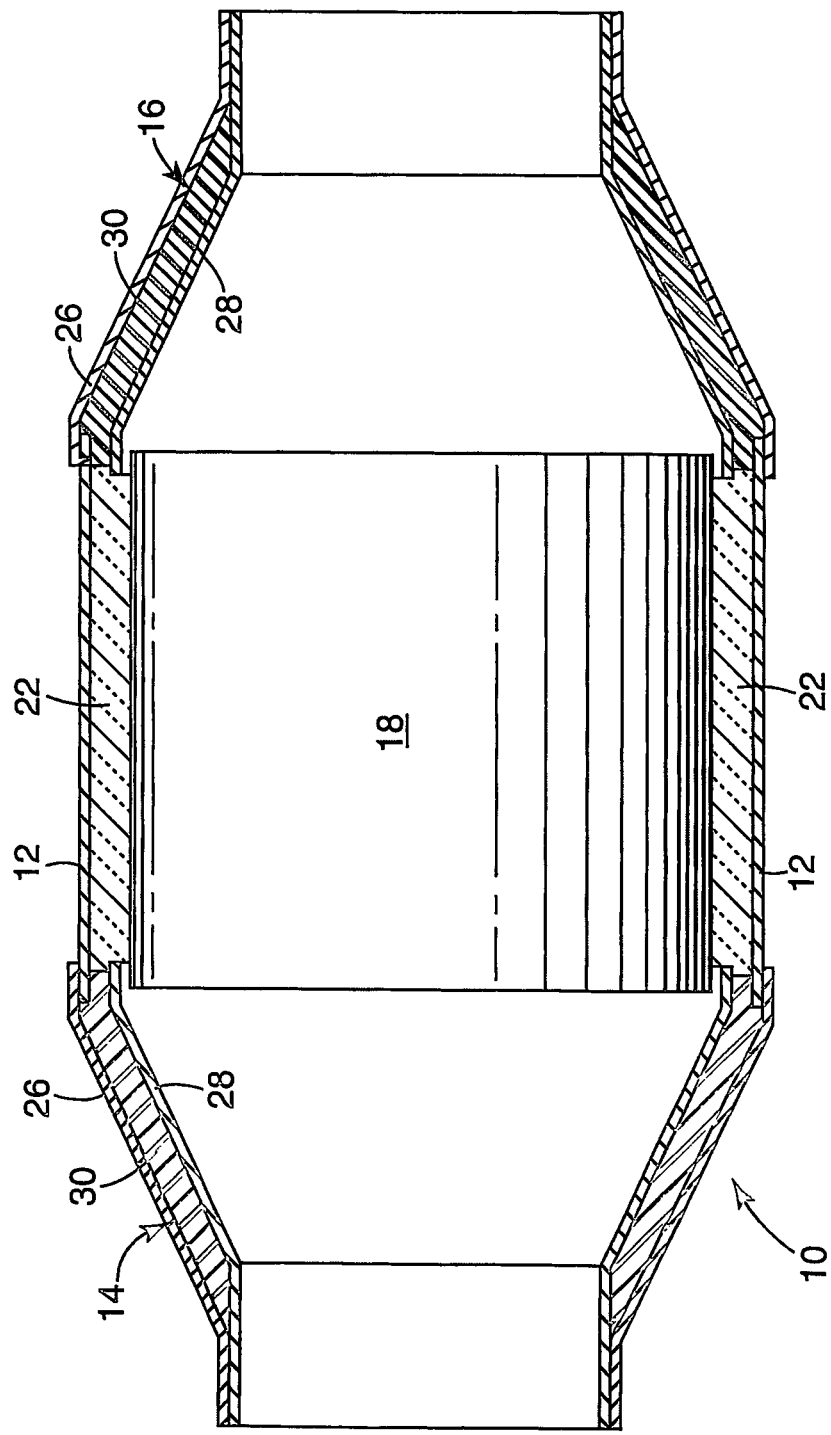
FIG. 1 shows a cross-sectional view of a pollution control device having a molded-three dimensional insulator between an inner end cone housing and outer end cone housing.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

This invention provides an article having a molded three-dimensional insulator suitable for use in the end cone region of a pollution control device and a method of making the article. As used herein, the phrase "molded three-dimensional insulator" refers to an insulating article that is not formed from a flat sheet of insulation material. Rather, the insulator is formed using a mold or die having a three-dimensional shape. Unlike insulators formed from a sheet, the molded three-dimensional insulator does not have a seam or seams that can be opened to provide a flat insulation article.

FIG. 1 shows a typical pollution control device having an insulator positioned between an inner end cone housing and an outer end cone housing. The pollution control device 10 includes an end cone housing 12 with a generally conical inlet 14 and outlet 16. The housing, which is also referred to as a can or a casing, is usually made of metal such as stainless steel. Disposed within the housing 12 is a monolithic structure 18 made of a ceramic or metallic material. The monolithic structure can include a catalyst. An insulating material 22 surrounds the monolithic structure 18.

The inlet 14 and outlet 16 regions of the metal housing include an inner end cone housing 28 and an outer end cone housing 26. Insulation material 30 is positioned between the inner end cone housing 28 and the outer end cone housing 26. The molded three-dimensional insulator of the present invention can be used as insulation material 30.

End cone insulation prepared from flat sheets or mats is known. The flat sheets or mats of insulation material can be cut to the desired size and shape and then formed to fit within the end cone region. For example, the flat sheet can be cut and formed into a conical shape having seams. The need to cut the sheet or mat to the desired size and shape results in some wasting of the insulation material. A molded three-dimensional insulator could result in the generation of less waste. Further, it can be difficult or impossible to cut a flat sheet to fit an end cone having a complex shape.

Molded three-dimensional insulators containing ceramic fibers are known. However, some of the insulators have been too stiff and difficult to position between the inner and outer end cone housing of a pollution control device. Some of the insulators have been of a non-uniform thickness. Insulation materials having a non-uniform thickness can also be difficult to position in the end cone region of a pollution control device.

One aspect provides an article that includes a molded three-dimensional insulator having dimensions suitable for use in an end cone region of a pollution control device. The insulator includes ceramic fibers having a bulk shrinkage no greater than 10 percent using the Thermal Mechanical Analyzer test. The insulator is self-supporting, seamless, and has a compressibility value no greater than 750 kN/m$^2$ when the mount density is 0.4 g/ml. The article can further include an end cone housing for a pollution control device attached to an inner surface of the insulator, an outer surface of the insulator, or a combination thereof.

Figure 2:
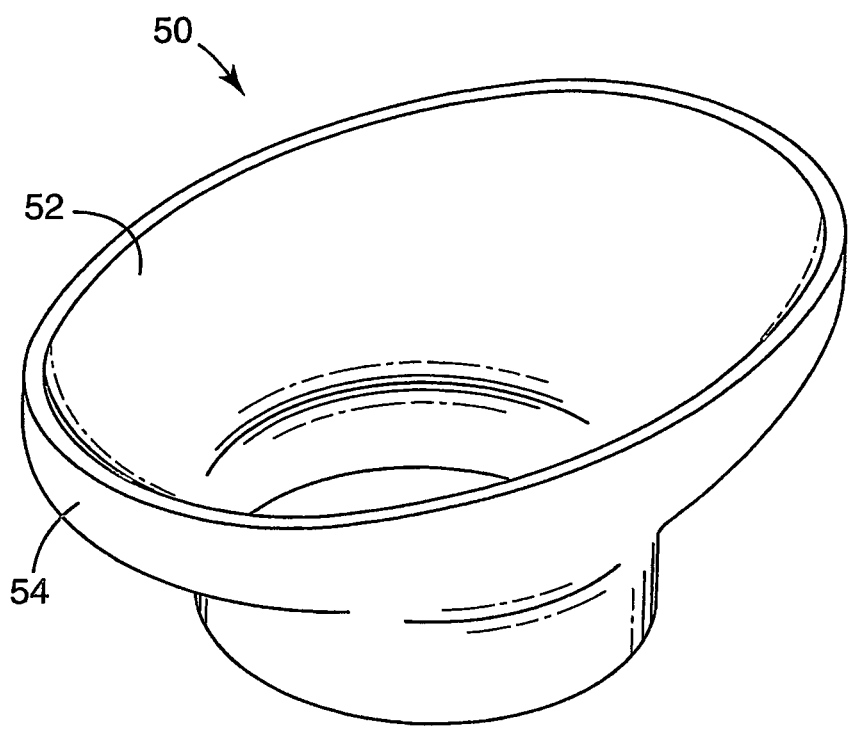
FIG. 2 shows a perspective view of one embodiment of a molded three-dimensional insulator suitable for use in the end cone region of a pollution control device.
Figure 3:
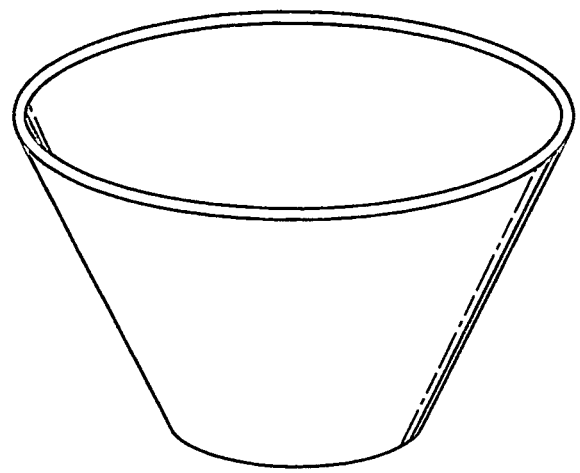
FIG. 3 shows a perspective view of another embodiment of a molded three-dimensional insulator suitable for use in the end cone region of a pollution control device.

FIG. 2 shows one embodiment of a molded three-dimensional insulator 50 having an inner surface 52 and an outer surface 54. The inner surface 52 of the insulator 50 can be adjacent to an inner end cone housing of a pollution control device. The outer surface 54 of the insulator 50 can be adjacent to an outer end cone housing of the pollution control device. Other shapes can be used to provided a generally conical shape for placement of the insulator in the end cone region of a pollution control device. One such shape is shown in FIG. 3.

Suitable ceramic fibers are those having a bulk shrinkage no greater than 10 percent using the Thermal Mechanical Analyzer (TMA) test. In the TVA test, a sample under a load (e.g., 50 psi or 345 N/m$^2$) is heated to 1000° C. and then cooled. The caliper of the sample can be measured during both the heating and cooling cycles at 750° C. to calculate percent shrinkage. The percent shrinkage is equal to the difference in the caliper at 750° C. during the heating and cooling step multiplied by 100 and divided by the caliper at 750° C. during the heating step. The TMA test can be used to characterize the ceramic fibers or an insulator prepared from ceramic fibers. Most or all of the organic materials that may be present in an insulator are removed by time the temperature of the Thermal Mechanical Analyzer reaches 750° C.

In some embodiments, the ceramic fibers have a bulk shrinkage no greater than 10 percent, no greater than 8 percent, no greater than 6 percent, no greater than 4 percent, no greater than 3 percent, no greater than 2 percent, or no greater than 1 percent. The ceramic fibers typically shrink at least 0.5 percent. In some embodiments, the ceramic fibers have a bulk shrinkage in the range of 0.5 to 2 percent, of 0.5 to 3 percent, of 0.5 to 5 percent, or of 0.5 to 6 percent using the TMA test.

Examples of commercially available ceramic fibers having a bulk shrinkage no greater than 10 percent as supplied (i.e., the fibers can be used as supplied without a heat treatment) include, but are not limited to, fibers that are crystalline and that contain both $Al_2O_3$ (i.e., alumina) and $SiO_2$ (i.e., silica). The weight ratio of $Al_2O_3$ to $SiO_2$ to ($Al_2O_3$: $SiO_2$) can be greater than or equal to 60:40, 65:35, 70:30, 72:28, 75:25, 80:20, 90:10, 95:5, 96:4, 97:3, or 98:2. In some specific examples, the ceramic fibers contain 60 to 98 weight percent $Al_2O_3$ and 2 to 40 weight percent $SiO_2$ based on the weight of the fibers. In other specific examples, the ceramic fibers contain 70 to 98 weight percent $Al_2O_3$ and 2 to 30 weight percent $SiO_2$ based on the weight of the fibers. Traces of other oxides can be present. As used herein, the term "trace" refers to an amount no greater than 2 weight percent, no greater than 1 weight percent, or no greater than 0.5 weight percent.

Suitable ceramic fibers that are usable without any heat treatment include, but are not limited, those commercially available from Mitsubishi Chemical (Tokyo, Japan) under the trade designation "MAFTEC" (e.g., MLS1, MLS2, and MLS3) with 28 weight percent $SiO_2$ and 72 weight percent $Al_2O_3$ based on the weight of the fibers; from Saffil Limited (Widness Cheshire, U.K.) under the trade designation "SAFFIL" (e.g., SF, LA Bulk, HA Bulk, HX Bulk) with 3 to 5 weight percent $SiO_2$ and 95 to about 97 weight percent $Al_2O_3$ based on the weight of the fibers; and from Unifrax (Tonawonda, N.Y.) under the trade designation "UNIF FIBERFRAX FIBERMAX" with 27 weight percent $SiO_2$ and 72 weight percent $Al_2O_3$ based on the weight of the fibers.

In some embodiments, commercially available ceramic fibers can be heat treated to provide ceramic fibers that have a bulk shrinkage less 10 percent. Such fibers typically include both $Al_2O_3$ and $SiO_2$. The weight ratio of $Al_2O_3$ to $SiO_2$ to ($Al_2O_3$: $SiO_2$) is greater than or equal to 20:80, 30:70, 35:65, 40:60, 45:55, 50:50, 55:45, 60:40, or 70:30. The ceramic fibers typically include at least 30 weight percent $SiO_2$ and at least 20 weight percent $Al_2O_3$. For example, suitable ceramic fibers can contain silica in an amount of 30 to 80 weight percent and alumina in an amount of 20 to 70 weight percent weight percent based on the weight of the fibers. In some specific examples, the ceramic fibers can contain silica in an amount of 40 to 60 weight percent and alumna in an amount of 40 to 60 weight percent based on the weight of the fibers. In other specific examples, the ceramic fibers can contain silica in an amount of 45 to 55 weight percent and alumina in an amount of 45 to 55 weight percent based on the weight of the fibers. Traces of other oxides can be present.

Exemplary ceramic fibers that are suitable after heat treatment include, but are not limited to, ceramic fibers commercially available from Thermal Ceramic (Augusta, Ga.) under the trade designation "KAOWOOL HA BULK" with 50 weight percent $SiO_2$ and 50 weight percent $Al_2O_3$ based on the weight of the fibers; from Thermal Ceramics under the trade designation "CERAFIBER" with 54 weight percent $SiO_2$ and 46 weight percent $Al_2O_3$ based on the weight of the fiber; from Thermal Ceramics under the trade designation "KAOWOOL D73F" with 54 weight percent $SiO_2$ and 46 weight percent $Al_2O_3$ based on the weight of the fiber; from Rath (Wilmington, Del.) under the trade designation "RATH 2300 RT" with 52 weight percent $SiO_2$, 47 weight percent $Al_2O_3$, and no greater than 1 weight percent $Fe_2O_3$, $TiO_2$, and others based on the weight of the fibers; from Rath under the trade designation "RATH ALUMINO-SILICATE CHOPPED FIBER" with 54 weight percent $SiO_2$, 46 weight percent $Al_2O_3$, and a trace of others based on the weight of the fiber; from Vesuvius (Buffalo, N.Y.) under the trade designation "CER-WOOL RT" with 49 to 53 weight percent $SiO_2$, 43 to 47 weight percent $Al_2O_3$, 0.7 to 1.2 weight percent $Fe_2O_3$, 1.5 to 1.9 weight percent $TiO_2$, and no greater than 1 weight percent others based on the weight of the fibers; from Vesuvius under the trade designation "CER-WOOL LT" with 49 to 57 weight percent $SiO_2$, 38 to 47 weight percent $Al_2O_3$, 0.7 to 1.5 weight percent $Fe_2O_3$, 1.6 to 1.9 weight percent $TiO_2$, and 0 to 0.5 weight percent others based on the weight of the fibers; and from Vesuvius under the trade designation "CER-WOOL HP" with 50 to 54 weight percent $SiO_2$, 44 to 49 weight percent $Al_2O_3$, 0 to 0.2 weight percent $Fe_2O_3$, 0 to 0.1 weight percent $TiO_2$, and no greater than 0.5 weight percent others based on the weight of the fibers.

In other embodiments of ceramic fibers that are suitable after a heat treatment, the ceramic fibers contain $SiO_2$, $Al_2O_3$, and $ZrO_2$. The weight ratio of $Al_2O_3$ to $SiO_2$ to ($Al_2O_3$:$SiO_2$) is greater than or equal to 20:80, 30:70, 35:65, 40:60, 45:55, 50:50, 55:45, 60:40, or 70:30. The fibers contain at least 3 weight percent $ZrO_2$, at least 30 weight percent $SiO_2$, and at least 20 weight percent $Al_2O_3$ based on the weight of the fiber. In some embodiments, the fibers contain up to 5 weight percent, up to 7 weight percent, up to 10 weight percent, up to 12 weight percent, up to 15 weight percent, up to 16 weight percent, up to 20, or up to 25 weight percent $ZrO_2$ based on the weight of the fibers. The ceramic fibers can contain $SiO_2$ in an amount of 30 to 70, 40 to 65, 45 to 60, 45 to 55, or 50 to 60 weight percent based on the weight of the fibers. The ceramic fibers can contain $Al_2O_3$ in an amount of 20 to 60, 25 to 50, 25 to 45, 25 to 40, 25 to 35, 30 to 50, or 30 to 40 weight percent based on the weight of the fibers. In some specific examples, the ceramic fibers contain 25 to 50 weight percent $Al_2O_3$, 40 to 60 weight percent $SiO_2$, and 3 to 20 weight percent $ZrO_2$ based on the weight of the fibers. In other specific examples, the ceramic fibers contain 30 to 40 weight percent $Al_2O_3$, 45 to 60 weight percent $SiO_2$, and 5 to 20 weight percent $ZrO_2$ based on the weight of the fibers. Traces of other oxides can be present.

Exemplary ceramic fibers that contain $SiO_2$, $Al_2O_3$, and $ZrO_2$ that are suitable after heat treatment include those commercially available from Thermal Ceramic (Augusta, Ga.) under the trade designation "KAOWOOL ZR" and "CER-ACHEM" with 50 weight percent $SiO_2$, 35 weight percent $Al_2O_3$, and 15 weight percent $ZrO_2$ based on the weight of the fiber; from Unifrax (Tonawonda, N.Y.) under the trade designation "UNIFRAX FIBERFRAX FIBERMAT" with 52 to 57 weight percent $SiO_2$, 29 to 47 weight percent $Al_2O_3$, and no greater than 18 weight percent $ZrO_2$ based on the weight of the fibers; from Unifrax under the trade designation "UNIFRAX FIBERFRAX DURABACK" with 50 to 54 weight percent $SiO_2$, 31 to 35 weight percent $Al_2O_3$, 5 weight percent $ZrO_2$, 1.3 weight percent $Fe_2O_3$, 1.7 weight percent $TiO_2$, 0.5 weight percent MgO, and no greater than 7 weight percent CaO based on the weight of the fibers; from Rath (Wilmington, Del.) under the trade designation "RATH 2600 HTz" with 48 weight percent $SiO_2$, 37 weight percent $Al_2O_3$, 15 weight percent $ZrO_2$, and no greater than 1 weight percent others based on the weight of the fibers; and from Vesuvius (Buffalo, N.Y.) under the trade designation "CER-WOOL HTZ" with 44 to 51 weight percent $SiO_2$, 33 to 37 weight percent $Al_2O_3$, 13 to 19 weight percent $ZrO_2$, 0.1 to 0.6 weight percent $Fe_2O_3$, 0.1 to 0.6 weight percent $TiO_2$, and no greater than 1 weight percent others based on the weight of the fibers.

The ceramic fibers tend to devitrify (i.e., change, at least in part, from an amorphous state into a microcrystalline or crystalline state) during the heat treatment process. Usually, only a portion of the individual ceramic fiber undergoes devitrification. That is, after heat treatment, the individual ceramic fibers contain amorphous material as well as crystalline material, microcrystalline material, or a combination of crystalline and microcrystalline material.

Techniques such as transmission electron microscopy and x-ray diffraction can be used to characterize the amorphous, crystalline, or microcrystalline nature of ceramic fibers. As used herein, the term "amorphous" refers to ceramic fibers that are free of crystalline or microcrystalline regions. If the ceramic fibers are amorphous, no diffraction peaks (i.e., no diffraction pattern) can be detected using either transmission electron microscopy or x-ray diffraction. If the ceramic fiber contains regions having a small crystalline size (i.e., microcrystalline), diffraction peaks (i.e., a diffraction pattern) can be detected using transmission electron microscopy but not using x-ray diffraction. As used herein, the term "microcrystalline" refers to ceramic fibers that have at least some regions with a crystalline character and that have a crystal size detectable with transmission electron microscopy but not with x-ray diffraction. If the ceramic fibers contain regions having a larger crystalline size (i.e., crystalline), a diffraction pattern can be obtained using x-ray diffraction. As used herein, the term "crystalline" refers to ceramic fibers that have at least some regions with a crystalline character and that have a crystal size detectable with x-ray diffraction. The smallest crystal sizes detectable using x-ray diffraction typically results in a broad diffraction pattern without well-defined peaks. Narrower peaks indicate a larger crystalline size. The width of the diffraction peaks can be used to determine the crystalline size.

In some applications, the ceramic fibers are heat treated at a temperature of at least 700° C. For example, the ceramic fibers can be heat treated at a temperature of at least 800° C., at a temperature of at least 900° C., at a temperature of at least 1000° C., or at a temperature of at least 1100° C. Suitable heat treatment temperatures can vary depending on the composition of the ceramic fibers and the time the ceramic fibers are held at the heat treatment temperature. Suitable heat treatment methods and suitable heat-treated ceramic fibers are further described, for example, in International Patent Application WO 99/46028 and U.S. Pat. No. 5,250,269, incorporated herein by reference.

There is a time-temperature relationship associated with the size of crystals or microcrystals that form during the heat treatment process. For example, the ceramic fibers can be heat treated at lower temperatures for longer periods of time or at higher temperatures for shorter periods of time to produce a comparable state of crystallinity or microcrystallinity. The time at the heat treatment temperature can be up to 1 hour, up to 40 minutes, up to 30 minutes, up to 20 minutes, up to 10 minutes, up to 5 minute, up to 3 minutes, or up to 2 minutes. For example, the heat treatment temperature can be chosen to use a relatively short heat treatment time such as up to 10 minutes.

The temperature of the heat treatment can be chosen to be at least 20° C., at least 30° C., at least 40° C., at least 50° C., at lest 60° C., at least 70° C., at least 80° C., at least 90° C., or at least 100° C. above the devitrification temperature (i.e., the temperature at which the ceramic fibers change from being an amorphous material to being a microcrystalline or crystalline material). Suitable heat treatment times and temperatures for the ceramic fibers can be determined using techniques such as, for example, Differential Thermal Analysis (DTA). The temperature for alumina-silica fibers is typically in the range of 700° C. to 1200° C., in the range of 800° C. to 1200° C., in the range of 900° C. to 1200° C., or in the range of 950° C. to 1200° C.

A ceramic fiber that is completely amorphous usually shrinks more than ceramic fiber that contain regions that are microcrystalline, crystalline, or a combination thereof. When amorphous fibers are made into a molded three-dimensional article, the article tends to shrink excessively when heated to elevated temperatures such as those encountered in a pollution control device. When insulation material containing amorphous fiber is used in the end cone region of the pollution control device, the insulation material that has shrunk upon heating tends to move around in the space between the inner and outer end cone housings. This movement can cause the insulation material to break apart and loose effectiveness as an insulator.

Ceramic fibers that are at least partially crystalline or microcrystalline can be fabricated into molded three-dimensional insulators that can be repeatedly heated to a temperature suitable for use in a pollution control device and then cooled. Microcrystalline or crystalline ceramic fibers tend to be resistant to further shrinkage that could negatively impact the performance of the insulators.

For ceramic fibers that are subjected to heat treatment, the brittleness of the fibers can be balanced with the low shrinkage characteristics. Crystalline or microcrystalline materials ceramic fibers tend to be more brittle than amorphous ceramic fibers. Insulation material made from crystalline or microcrystalline ceramic fibers can more easily be broken than insulation prepared from amorphous fibers. On the other hand, crystalline or microcrystalline ceramic fibers tend to have a lower shrinkage than amorphous ceramic fibers.

The insulators of the invention have a compressibility value no greater than 750 kN/m$^2$, no greater than 700 kN/m$^2$, no greater than 650 kN/m$^2$, no greater than 600 kN/m$^2$, no greater than 550 kN/m$^2$, no greater than 500 kN/m$^2$, no greater than 450 kN/m$^2$, no greater than 400 kN/m$^2$, no greater than 300 kN/m$^2$, no greater than 200 kN/m$^2$, or no greater than 100 kN/m$^2$ when the mount density is 0.4 g/ml. The compressibility value is usually at least 50 kN/m$^2$ when the mount density is 0.4 g/ml; however, insulators having a lower compressibility value can be used if the mount density is greater than 0.4 g/ml. As used herein, the "mount density" refers to the density of the insulator within a fixed gap (e.g., the insulator is typically under pressure). In some embodiments, the compressibility value is at least 75 kN/m$^2$ or at least 100 kN/m$^2$ when the mount density is 0.4 g/mil. For example, the compressibility value can be in the range of 50 to 750 kN/m$^2$, 50 to 500 kN/m$^2$, 50 to 300 kN/m$^2$, 75 to 400 kN/m$^2$, 75 to 300 kN/m$^2$, 100 to 400 kN/m$^2$, or 100 to 300 kN/m$^2$. The insulators can be compressed without breaking or disintegrating.

The insulator is usually flexible. As used herein, the term "flexible" refers to an insulator that can have its three-dimensional shape distorted or bent to fit between the inner and outer housing in an end cone region of a pollution control device without cracking, breaking, or falling apart. A flexible insulator usually can be compressed in the thickness direction.

A second aspect of the invention also provides a molded three-dimensional insulator having dimensions suitable for use in an end cone region of a pollution control device. The insulator includes ceramic fibers that contain at least 20 weight percent alumina and at least 30 weight percent silica based on the weight of the fibers. The ceramic fibers are microcrystalline, crystalline, or a combination thereof. The insulator is self-supporting, seamless, and has a compressibility value no greater than 750 kN/m$^2$ when the mount density is about 0.4 g/ml. Suitable ceramic fibers are described above. The article can further include an end cone housing for a pollution control device attached to an inner surface of the insulator, an outer surface of the insulator, or a combination thereof.

The molded three-dimensional insulators are formed by initially preparing an aqueous slurry containing the ceramic fibers. Organic binders can be included in the aqueous slurry composition in addition to the ceramic fibers. Organic binders tend to improve the integrity, flexibility, and the handling characteristics of molded three-dimensional insulator. Insulation material that is more flexible may be easier to position between the inner and outer end cone housings of a pollution control device.

Organic binders can be used in amounts up to 20 weight percent based on the weight of the insulator. In some embodiments, the organic binder is present in amounts up to 10 weight percent, up to 5 weight percent, or up to 3 weight percent based on the weight of the insulator. The organic binder is typically burned off the insulator when the insulator is used at elevated temperatures such as those typically encountered in a pollution control device.

Suitable organic binder materials can include aqueous polymer emulsions, solvent-based polymers, and solvent free polymers. The aqueous polymer emulsions can include organic binder polymers and elastomers in the form of a latex (e.g., natural rubber lattices, styrene-butadiene lattices, butadiene-acrylonitrile lattices, and lattices of acrylate and methacrylate polymers or copolymers). The solvent-based polymeric binder materials can include a polymer such as an acrylic, a polyurethane, a vinyl acetate, a cellulose, or a rubber based organic polymer. The solvent free polymers can include natural rubber, styrene-butadiene rubber, and other elastomers.

In some embodiments, the organic binder material includes an aqueous acrylic emulsion. Acrylic emulsions advantageously tend to have good aging properties and non-corrosive combustion products. Suitable acrylic emulsions can include, but are not limited to, commercially available products such as those sold under the trade designation "RHOPLEX TR-934" (an aqueous acrylic emulsion having 44.5 weight percent solids) and "RHOPLEX HA-8" (an aqueous emulsion of acrylic copolymers having 45.5 weight percent solids) from Rohm and Hass (Philadelphia, Pa.); under the trade designation "NEOCRYL XA-2022" (an aqueous dispersion of an acrylic resins having 60.5 percent solids) available from ICI Resins US (Wilmington, Mass.); and under the trade designation "AIRFLEX 600BP DEV" (an aqueous emulsion of ethylene vinyl acrylate terpolymer having 55 weight percent solids) from Air Products and Chemical, Inc. (Philadelphia, Pa.).

Organic binders can also include a plasticizer, a tackifier, or a combination thereof. Plasticizers tend to soften a polymer matrix and can enhance the flexibility and moldability of the insulator. For example, the organic binder can include a plasticizer such as isodecyl diphenyl diphosphate commercially available under the trade designation "SANTICIZER 148" from Monsanto (St. Louis, Mo.). Tackifiers or tackifying resins can aid in holding the insulation material together. An example of a suitable tackifier is commercially available from Eka Nobel, Inc. (Toronto, Canada) under the trade designation "SNOWTACK 810A".

The aqueous slurry can include an inorganic colloidal material. The inorganic colloidal material can act as an inorganic binder, as a coagulant to facilitate removal of the ceramic fibers from the aqueous slurry to form a molded three-dimensional preform, as a filler material, or a combination thereof. The inorganic colloid is usually a clay or a metal hydroxide.

In some applications, the inorganic colloidal material is formed in the presence of the ceramic fibers. The inorganic colloid material can be formed by adding one or more water-soluble precursors to the aqueous slurry. The precursor can react to form, for example, a metal hydroxide in the aqueous slurry. Forming the inorganic colloidal material in the aqueous slurry tends to minimize agglomeration of the inorganic colloid and enhance uniformity of the inorganic colloid distribution throughout the slurry and the resulting preform. The pH of the slurry should be sufficiently high to form the metal hydroxide. The size of the colloidal particles can be altered, for example, by variation of the pH, reaction time and temperature, precursor concentration, and the relative ratio of the precursors. The pH of the slurry is typically at least about 3. Suitable inorganic colloidal materials can include a metal hydroxide such as, for example, aluminum hydroxide, silicon hydroxide, titanium hydroxide, yttrium hydroxide, or a combination thereof.

An example of an inorganic colloidal metal hydroxide is aluminum hydroxide formed by the reaction of an alkali metal aluminate and an aluminum salt. More specifically, aluminum hydroxide can form, for example, from the reaction of sodium aluminate with aluminum sulfate, aluminum phosphate, aluminum chloride, aluminum nitrate, or a mixture thereof. As another example, colloidal aluminum hydroxide can be formed from aluminum sulfate by adjustment of the pH of the slurry to at least about 3.

The inorganic colloidal material is usually present in an amount no greater than 50 weight percent based on the weight of the ceramic fibers. In some embodiments, the inorganic colloidal material is present in an amount no greater than 40, no greater than 30 weight percent, no greater than 20 weight percent based on the weight of the ceramic fibers. For example, an aluminum hydroxide colloid can be formed by mixing 1 to 20 weight percent sodium aluminate and 1 to 20 weight percent aluminum sulfate based on the weight of the ceramic fibers. In more specific examples, an aluminum hydroxide colloid can be formed by mixing 3 to 15 weight percent sodium aluminate with 3 to 15 weight percent aluminum sulfate or 5 to 12 weight percent sodium aluminate with 5 to 12 weight percent aluminum sulfate. In still other examples, the aluminum hydroxide colloid can be formed from aluminum sulfate. For example, the aluminum hydroxide colloid can be formed from 10 to 40 weight percent aluminum sulfate or from 15 to 30 weight percent aluminum sulfate based on the dry weight of the ceramic fibers. The percent of each precursor (e.g., aluminum sulfate or sodium aluminate) is based on the dry weight of the precursor.

The inorganic colloidal material can function as a binder to hold together the ceramic fibers. In some applications, an inorganic binder can improve the temperature resiliency of the insulator. An organic binder typically decomposes at elevated temperatures, such as the temperatures encountered in a pollution control device. An insulator that lacks an inorganic binder can, under some circumstances, break apart and loose effectiveness as an insulation material.

The inorganic colloidal material can be uniformly distributed in the molded three-dimensional insulator. As such, the insulator is more likely to remain intact during fabrication and use of an article containing the insulator such as in a pollution control device.

In some embodiments, the article includes the molded three-dimensional insulator and one or two end cone housings of a pollution control device. The end cone housing can be adjacent to the inner surface, adjacent to the outer surface, or adjacent to both the inner and outer surface of the insulator (i.e., the insulator can be positioned between two end cone housings). The end cone housing, in some applications, is attached to the insulator. The end cone housing if often attached by frictional forces.

A third aspect of the invention provides a method of making an article that includes a molded three-dimensional insulator suitable for use in an end cone region of a pollution control device. The method involves preparing an aqueous slurry, vacuum forming a molded three-dimensional preform from the aqueous slurry on a permeable forming die, and drying the preform to produce the molded three-dimensional insulator. The aqueous slurry used to prepare the preform includes ceramic fiber having a bulk shrinkage no greater than 10 percent based on the Thermal Mechanical Analyzer test. The insulator is self-supporting and has a compressibility value no greater than 750 $kN/m^2$ when the mount density is 0.4 g/ml.

The aqueous slurry often contains up to 30 weight percent solids based on the weight of the slurry. For example, the slurry can contain up to 20 weight percent or up to 10 weight percent solids based on the weight of the slurry. The slurry often contains at least 1 percent solids based on the weight of the slurry. For example, the slurry can contain at least 2 weight percent or at least 3 weight percent solids. In some embodiments, the slurry can contain 1 to 10, 2 to 8, or 3 to 6 weight percent solids. Higher solids can be advantageous because less water needs to be removed to prepare the preform. However, slurries with higher percent solids tend to be more difficult to mix.

The water used in the slurry can be well water, surface water, or water that has been treated to remove impurities such as salts and organic compounds. When well or surface water is used in the aqueous slurry, salts (e.g., calcium and magnesium salts) present in the water can function as an inorganic binder. In some embodiments, the water is deionized water, distilled water, or a combination thereof.

Other additives can also be included in the aqueous slurry composition. Such additives can include defoamers, flocculants, surfactants, and the like. Strength enhancing agents can also be included such as, for example, organic fibers and glass fibers. Suitable organic fibers include rayon and cellulose fibers.

In some applications, the slurry is free of intumescent materials. Intumescent materials tend to become separated from the molded three-dimensional insulator. Once free from the insulator, the intumescent material can move and impact the insulator or monolith. For example, if used in the end cone region of a pollution control device, the intumescent material could continuously impact the insulator or monolith when the vehicle containing the pollution control device is moving. The insulator has an increased tendency to disintegrate under such circumstances. If the disintegration is severe, the article can no longer function as an insulation material. The monolith could also begin to plug if large debris is released into the inlet.

The aqueous slurry is typically prepared by initially adding the ceramic fibers to water and by mixing well. In some embodiments, a low-shear mixer is used. Any suitable mixing methods can be used that does not excessively break the ceramic fibers. Heat treated fibers tend to break more easily than their non-heat treated counterparts. Ceramic fibers that are microcrystalline tend to break less readily than heat treated ceramic fibers having a larger crystalline size.

The ceramic fibers in aqueous slurry compositions usually have an average length no greater than 40 mm. In some embodiments, the average length is no greater than 30 mm, no greater than 25 mm, no greater than 20 mm, no greater than 15 mm, or no greater than 10 mm. The average length is typically greater than 0.5 mm. In some embodiments, the average length is greater than 1 mm or greater than 2 mm. For example, the average fiber length can be 0.5 mm to 40 mm, 0.5 mm to 25 mm, or 1 mm to 40 mm.

The average diameter of suitable ceramic fibers is often no greater than 20 microns. In some embodiments, the average diameter is no greater than 10 microns or no greater than 8 microns. The average diameter is typically greater than 0.5 micron, 1 microns, or 2 microns.

Although the components of the aqueous slurry can be added in any order, an organic binder is often added after an aqueous slurry of the ceramic fibers has been formed. An inorganic colloidal material or the precursors for the inorganic colloidal material can be added after the organic binder has been added to the aqueous slurry. Mixing is continued during the reaction that forms the inorganic colloidal material to ensure that the colloidal material is uniformly mixed throughout the slurry.

Any suitable type of molding technique or mold known in the art can be used to prepare a preform. In some applications, the molded three-dimensional preform can be prepared using a vacuum forming technique. A permeable forming die is placed in the slurry. The solids in the slurry can deposit on the surface of the forming die when a vacuum is drawn. In some applications, the forming die can be removed from the slurry and coupled with a shape-retaining device having the same shape as the forming die. The deposited ceramic fibers are positioned between the forming die and the shape-retaining device. The shape-retaining device and the forming die can be pressed together to further remove water and produce a preform having a relatively smooth surface and a relatively uniform thickness. The shape-retaining device or the forming die can be the male molding part (i.e., if the forming die is the male molding part, then the shape-retaining device is the female molding part or if the forming die is the female molding part, then the shape-retaining device is the male molding part).

The permeable forming die can include, for example, a screen. The screen size can be chosen so that the liquid components but not the ceramic fibers pass through the screen. For example, the screens can be in the size range of 20 (about 850 microns) to 80 mesh (about 180 microns) or in the size range of 30 (about 600 microns) to 80 mesh. If the mesh size is too fine, the screen is easily plugged. If the mesh size is too large, the screen does not retain the ceramic fibers (i.e., a preform cannot be formed). Under normal operating conditions, some of the solids from the slurry deposit on the screen when a vacuum is pulled.

The preform can be dried to form a molded three-dimensional insulator. If the preform is fairly firm, it can be dried without being supported. That is, after being formed on the forming die, the preform can be removed from the die for further drying. In some embodiments, the preform is dried while being supported by the forming die, the shape-retaining device, or a combination thereof. This additional support helps prevent the preform from collapsing until it becomes drier and firmer. The preform can be dried using any method known in the art. For example, the preform can be dried in an oven or at room temperature. When dried in an oven, the temperature can be up to about 200° C. In some applications, the drying temperature can be up to about 150° C. or up to about 125° C.

In some applications, the preform can be dried while in contact with the forming die. A stream of air or nitrogen can be blown though the forming die as part of the drying process. The air or nitrogen that is blown through the forming die can be at room temperature or at an elevated temperature. Additional air or nitrogen can be passed over or impinge the outer surface of the preform opposite the surface in contact with the forming die.

In some applications, the molding process can be similar to those disclosed in U.S. Pat. Nos. 5,078,822 and 6,596,120 B2, the disclosure of which is incorporated herein by reference. The three-dimensional preform can be prepared using a die assembly that includes a multi-component die and a shape-retaining device. The multi-component die is a permeable forming die and usually includes an internal skeleton and an outer shell. The internal skeleton had a vacuum system through its interior to provide vacuum pull and vacuum distribution throughout the die. The outer shell of the forming die has a screen. For example, the screen can have a mesh size of 20 to 80 mesh. The multi-component forming die is permeable. The die assembly can be positioned in the slurry such that the multi-component forming die is separated from the shape-retaining device.

A vacuum can be connected to the multi-component forming die and a layer containing ceramic fibers can deposit on the forming die. The outer dimensions of the deposited layer (i.e., the outer dimensions of the preform) can be at least equal to, if not slightly larger than, the interior dimensions of an outer housing for the end cone region of a pollution control device into which the resulting insulator will be placed. While in a wet condition, the die-supported preform can be inserted into the shape-retaining device (e.g., the shape-retaining device can be a outer end cone housing of a pollution control device). The forming die can be removed where the preform is partially inserted into the shape-retaining device or when the preform is in full contact with the shape-retaining device. In some applications, the preform contacts the shape-retaining device while still being supported by the forming die.

Alternatively, the multi-component forming die can have dimensions and a shape that prepares a preform that fits over a shape-retaining device (e.g., the shape-retaining device can be an inner end cone housing of a pollution control device). While in a wet condition, the forming die-supported preform can be inserted onto the shape-retaining device. The die can be removed where the preform is partially inserted onto the shape-retaining device or when the preform is in full contact with the shape-retaining device. In some applications, the preform contacts the shape-retaining device while still being supported by the forming die.

Pressure can be applied to the preform to increase the level of contact between the preform and the shape-retaining device. That is, the preform can be pressure fitted into the shape-retaining device. The preform can be transferred to the shape-retaining device by removing the vacuum applied to the forming die, by applying air or nitrogen through the permeable forming die, or by other methods known in the art and withdrawing the forming die. After the forming die is removed, the combination of preform and shape-retaining device can be placed in an oven to evaporate water from the preform.

When pressure is applied to the preform positioned between the forming die and the shape-retaining device, the preform can be pressure fitted to the shape-retaining device. In some applications, the preform can be dried within the shape-retaining device to prepare an insulator that is attached to the shape-retaining device, for example, by friction. For example, an insulator attached to an inner or outer end cone housing of a pollution control device can be prepared.

Pressure fitting the preform to a shape-retaining device can result in the formation of insulators having a relatively smooth surface. That is, an insulator prepared by pressing the preform into a shape-retaining device is typically smoother than an insulator prepared using only a forming die. Further, the thickness uniformity of the preform and the resulting insulator can typically be improved by pressure fitting the preform to the shape-retaining device.

Pressure fitting the preform into a shape-retaining device can also result in the formation of an insulator with clean edges. That is, the application of pressure tends to shear the ceramic fibers at the edge of the preform and reduce the number of ceramic fibers extending beyond the edges of the shape-retaining device.

In some applications, additional inorganic binders can be applied to the surface of the molded three-dimensional insulator to further stiffen the insulator. For example, a solution of an additional inorganic binder can be applied to the inner or outer surface of the three-dimensional shape before or after drying. Suitable additional inorganic binders include, for example, alumina sols, titania sols, zirconia sols, colloidal silica suspensions, clays, refractory coatings such as silicon carbide suspensions, or solutions of an aluminum or phosphate salts. The additional inorganic binder is usually added in an amount to provide an insulator that is flexible and conformable. If too much additional inorganic binder is used, the insulator can become too stiff (i.e., not flexible) and non-compressible (i.e., compression value greater than 750 kN/m$^2$ at a mount density of about 0.4 g/ml). The additional inorganic binder usually can be added to the surface of the preform in an amount up to 10 weight percent on a dry weight basis of the preform or insulator. For example, the additional inorganic binder can be added to the surface in an amount up to 5 weight percent, up to 3 weight percent, or up to 1 weight percent on a dry weight basis of the preform or insulator.

In some other applications, additional organic binders or material can be applied as a coating to the inner surface of the insulator, outer surface of the insulator, or a combination thereof. Application of such a coating can improve the smoothness of the insulator, reduce the friction of the insulator, improve the ease of positioning the insulator between the inner and outer housing in the end cone region of a pollution control device, or combinations thereof. The organic coating can include, for example, a polyolefin material or an acrylic material.

The thickness of the insulator can vary depending on the application. The thickness can be affected by variables such as the dwell time and vacuum level. A longer dwell time (i.e., the length of time the forming die is in the slurry under vacuum conditions) typically results in the formation of a thicker preform and insulator. Likewise, a stronger vacuum with the same dwell time typically results in the formation of a thicker preform and insulator. When used as insulation in the end cone region of a pollution control device, the thickness of the insulator typically ranges from 1 mm to 25 mm. In some embodiments, the thickness is uniform across the shape. Thickness uniformity can be affected by the size of the ceramic fibers (i.e., smaller ceramic fibers tend to produce a preform having a more uniform thickness). Insulators with a fairly uniform thickness can be easier to position between the outer and inner housing in an end cone region of a pollution control device.

The bulk density (i.e., density in the absence of pressure) of the molded three-dimensional insulator can vary depending on the process used to prepare the insulator. The bulk density is typically in the range of 0.1 to 0.4 g/ml. In some embodiments, the insulator has a bulk density of 0.15 to 0.3, 0.2 to 0.4, or 0.2 to 0.3 g/ml.

A fourth aspect of the invention provides a method of making an article that includes a molded three-dimensional insulator suitable for use in an end cone region of a pollution control device. The method involves preparing an aqueous slurry, vacuum forming a molded three-dimensional preform from the aqueous slurry on a permeable forming die, and drying the preform to produce the molded three-dimensional insulator. The aqueous slurry used to prepare the preform includes ceramic fiber that contain at least 20 weight percent alumina and at least 30 weight percent silica. The ceramic fibers can be microcrystalline, crystalline, or a combination thereof. The insulator is self-supporting and has a compressibility value no greater than 750 kN/m$^2$ when the mount density is 0.4 g/ml.

The methods of preparing a molded three-dimensional insulator can be used to prepare seamless articles or articles with a seam. In some embodiments, the articles are seamless. As used herein, the term "seamless" refers to a molded three-dimensional insulator that does not have any separation or discontinuity of materials forming the insulator such as by a cut or notch in the insulation material. That is, a seamless insulator is free of notches, cuts, or other separations formed through a portion of the insulator to relieve stress. FIGS. 2 and 3 are perspective views of seamless, molded three-dimensional insulators. Any lines shown on the surface of the article are meant for shading purposes to suggest a three-dimensional shape.

In other embodiments, insulators with seams can be prepared. As used herein, the term "seam" refers to a separation of material such as by a cut or notch in the insulation material. The seam can be used, for example, to relieve stress or to enhance the conformability of the insulator during the canning process (i.e., in some applications, a seam can improve the ability to position the insulator between an outer and inner end cone housing of a pollution control device). A seam can extend through part of the thickness of the insulator or through the entire thickness of the insulator.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

Test Methods

Bulk Shrinkage

The bulk shrinkage of a mass of ceramic fibers was determined by Thermal Mechanical Analysis (TMA) using a Theta Dilatronic II Thermal Analyzer, Model MFE-715 (obtained from Theta Industries, Inc., Port Washington, N.Y.) having a chart recorder. A sample of fiber was cut using a circular die having a diameter of 11 mm and placed on a platen in the furnace. A 7 mm diameter quartz rod (about 35.6 cm long) supporting a 1350 gram weight was placed over the sample and the furnace was closed. This corresponds to a load of about 50 psi (345 kN/m$^2$) applied to the sample. The sample with the applied weight was allowed to stabilize for about 5 minutes prior to heating to 1000° C. at a rate of 15° C./min. After the oven reached 1000° C., the furnace was turned off and cooled to room temperature. The sample was cooled within the furnace. The thickness of the sample, measured as the gap between the end of the rod and the platen, was plotted on a chart recorder during both the heating and cooling cycles. The percent shrinkage was calculated from the thickness (T1) recorded at 750° C. during the heating cycle and the thickness (T2) recorded at 750° C. during the cooling cycle. The bulk shrinkage was calculated as % Bulk Shrinkage=[(T1−T2)/T1]×100.

The TMA test can be used for samples with or without organic binder materials. Organic materials will usually burn out at about 500° C. During the heating cycle, the thickness of the sample measured at 750° C. is essentially the thickness of the mass of fibers with inorganic binders and particles, if present. As the sample is heated further, any shrinkage of the fibers that occurs up to 1000° C. will be apparent during the cooling cycle if the thickness measured at 750° C. is less than the thickness of the sample during the heating cycle.

Compressibility

The compressibility was a measure of the resistance to compression of an insulation material within a fixed gap at room temperature (e.g., about 20° C. to about 25° C.) and is expressed as a force per unit area, kN/m$^2$ (kiloNewtons/meter$^2$). The test was conducted on a square sample of the insulation material measuring about 3.8 cm by 3.8 cm on a compression tester made by MTS Systems Corp (Research Triangle Park, N.C.). The tester had a stationary lower platen and an upper platen attached to a load cell. The sample was placed on the lower platen, and the upper platen was lowered at a rate of 30.48 cm/minute to a fixed gap that was determined by the desired mount density. The insulation material exhibited a peak force when the upper platen first reached the gap set for the mount density as it compressed the sample. The platen was then stopped and held at that point for 15 seconds during which time the insulation material relaxed and the force it exerted was reduced. As used herein, the term "compression value" refers to the compression measured after holding for 15 seconds. The compression value is dependent on the mount density.

The mount density is the density of an insulating material within a confined gap (i.e., the insulation material is under pressure) as is typically found between two nesting concentric cone housings in a double walled end cone of a pollution control device (i.e., the end cone region typically includes the insulator positioned between an inner end cone housing and an outer end cone housing). The end cone housing refers to the housing in the end cone region of the pollution control device. The mount density of the insulator positioned between the two end cone housings is usually, but not always, uniform throughout the insulator. The mount density (in grams/ml) is calculated as the basis weight of the insulation material in grams/cm$^2$ divided by the gap in cm. The basis weight is determined by cutting out a known area of the insulator and weighing it.

In the assembly of the pollution control device having a double walled end cone, the insulator can be placed against the inner surface of the outer end cone housing and the outer surface of the inner end cone housing can be positioned against the insulator. Alternatively, the insulator can be placed on the outer surface of the inner end cone housing and the insulator can then be positioned against the inner surface of the outer end cone housing. The two end cone housings are pressed together, compressing the insulator between the inner and outer end cone housing. The inner and outer end cone housings are typically welded together on the smaller end of the cone. This further compresses the insulator within the gap between the two end cone housings such that there is typically a maximum force per area exerted by the insulator against the two housings when the end cone housings are first welded together. Within a short time the insulator usually relaxes between the inner and outer housings and exerts a lower pressure against the housings. The reduced pressure is sufficient to hold the insulator in place during use.

RCFT (Real Condition Fixture Test)

The RCFT modeled the conditions found in the gap of a double walled end cone on a metal pollution control device during normal use, and measured the pressure exerted by the insulating material as if it were mounted between the inner and outer end end cone housing of the device under the conditions modeled. The insulating material was placed between two 50.8 mm by 50.8 mm stainless steel platens and the platens are closed so that the insulating material was at a mount density of 0.4 g/ml. The platens were controlled independently and were heated to different temperatures to simulate the temperatures of the outer end cone housing, which is exposed to cooler ambient temperature air, and the inner end cone housing, which is exposed to hot exhaust gases, of the pollution control device during use. The platens were heated to a set point temperature as indicated in Table 4 below. The gap between the platens decreased and then increased by a value calculated from the coefficients of thermal expansion of the inner and outer end cone housings at their respective temperatures. The gap decreased very slightly as the temperature increased up to about 450° C. on a first platen (i.e., Platen 1) to simulate the slightly higher expansion that the inner end cone housing undergoes from being closer to the hot exhaust gases. As the temperatures continued to increase, the gap increased slightly as the metal on the second platen (i.e., Platen 2) expanded. The temperatures of the platens, Platen 1 simulating the inner end cone housing and Platen 2 simulating the outer end cone housing, are shown in Table 4 below. The pressure force exerted by the mounting material was measured using a Sintech ID computer-controlled load frame with an Extensometer obtained from MTS Systems Corp., Research Triangle Park, N.C. A suitable insulator usually can exert pressure within the gap throughout the heating and cooling cycles and particularly during the 15 minutes when the platens are held at 900° C. and 530° C. when the pressure is likely to be the lowest.

Example 1

A slurry containing 95.5 weight percent water, 2.95 weight percent ceramic fibers, 0.95 weight percent sodium aluminate, and 0.6 weight percent active aluminum sulfate (added in the form of a 50% aluminum sulfate solution in water) was prepared in a 5 gallon, plastic lined drum. Using an industrial grade low-shear mixer at low speed, the ceramic fibers were slowly added to 15.4 liters (l) of well water in the drum while increasing the stirring speed of the mixer to disperse the ceramic fibers and to break apart large clumps of fibers. When all of the ceramic fiber had been added, the sodium aluminate was added and mixed for approximately 3 minutes. The aluminum sulfate solution was then added slowly, and the slurry was mixed another 5 minutes until the slurry appeared uniform.

The ceramic fibers used in the preparation of this example were aluminosilicate fibers commercially available under the trade designation "KAOWOOL HA-BULK" from Thermal Ceramics, Augusta, Ga. The ceramic fibers have a composition of about 50% alumina and 50% silica. The fibers were heat treated to have a bulk shrinkage of 4.5% as determined by the TMA test. A sufficient amount of heat treating was obtained by heating the bulk fibers for about 3 minutes at 1060° C. The heat treated fibers had an average diameter of about 3 microns and an average length less than about 10 mm. When analyzed using x-ray diffraction, a broad peak was obtained at a 2θ angle of about 22.5 degrees using a copper $K_\alpha$ line as the radiation source. The fibers contained crystalline regions but the crystalline size was not large enough to result in a narrow diffraction peak. The same fibers without a heat treatment had a bulk shrinkage of about 47% and were amorphous.

A preform was formed by dipping the screen side of a forming die attached to a vacuum system into the uniformly mixed slurry. The die had an elliptical conical section formed by a 50-mesh screen, and the preform had the shape of a truncated elliptical cone that was open on the top and the bottom. The opening at the top of the cone was an ellipse having approximate diameters of 10.5 cm by 3.8 cm, and the opening on the bottom of the cone was an ellipse having approximate diameters of 12.1 cm by 4.3 cm. The cone about was 7 cm high. The walls of the preform had a thickness in the range of about 1.5-15 mm depending on the process conditions chosen. The dipping time and vacuum level could be varied to change sample thickness and basis weight to suit the end use.

When the desired wall thickness was attained, the die, with the preform attached, was removed from the slurry and the preform was covered with a plastic bag. The plastic bag simulated a female portion of a two-part mold to hold the materials of the preform in place. Vacuuming continued a few more seconds until the preform was relatively firm and most of the water was out. The vacuum was then turned off and the preform was carefully removed from the die by blowing compressed air through the die to release the preform.

The preform was self-supporting (i.e., when placed on a surface, the preform substantially maintained its shape without collapsing or deforming). The preform was dried in an oven at 150° C. for 40 minutes to form a conically shaped three dimensional insulator suitable for insulating an end cone region of a pollution device. The resulting insulator was freestanding (i.e., the insulator could support its own weight when placed on a flat surface without collapsing). When the insulator was lightly compressed by hand in the thickness direction and then released, it was slightly resilient (i.e., the insulator's thickness tends to spring back, although not necessarily to its original thickness, as long as the compression force does not exceed the crush strength of the fibers).

Example 2

A slurry was prepared by adding about 178 liters of well water to a stainless steel mixing tank equipped with an in-line propeller mixer operating at medium-high speed. Slowly, 5.7 kg of heat treated ceramic fibers (described in Example 1) were added while the speed of the mixer was increased to the maximum level to maintain the dispersion and to break apart large clumps of fibers. Then 1.1 kg of latex (an aqueous emulsion of ethylene vinyl acrylate terpolymer having 55 weight percent solids, sold under the trade designation "AIRFLEX 600BP" by Air Products, Philadelphia, Pa.) was added and mixed for about 5 minutes. The latex addition was followed by addition of 1.9 kg of active aluminum sulfate in a 50% solids aqueous solution, addition of another 178 liters of well water, and then addition of 90.7 grams of a defoamer (commercially available from Henkel, Germany under the trade designation "FOAMASTER III"). The slurry was mixed for about 10 minutes until uniform, and then pumped into a plastic lined 55 gallon (208 liter) drum. On a dry weight basis (i.e., without water), the composition was 78 weight percent heat treated ceramic fibers, 8 weight percent latex, 13 weight percent aluminum sulfate, and 1 weight percent defoaamer.

The slurry in the drum was mixed again with a mixer and purged with air to form a uniform dispersion. A conical preform was prepared from the slurry by submerging a multi-component forming die into the slurry and depositing solids from the slurry on the die until the desired thickness, weight, and density were achieved. Sufficient solids from the slurry were deposited on the die so that when the preform was dried to form an insulator, it had a target thickness of about 8.0-9.0 mm, a target weight of about 30 grams, and a target density of about 0.20 g/ml.

The multi-component forming die construction included an internal skeleton and an outer shell. The internal skeleton had a vacuum system through its interior to provide vacuum pull and vacuum distribution throughout the die. The outer shell of the forming die had an open screen having 900 openings per 6.45 square centimeters. The outer shell had a shape and size of the outer surface of the inner end cone housing of a double walled end cone of a pollution control device (i.e., the outer shell had a shape corresponded to the inner end cone housing of the end cone region of a pollution control device).

The preform, while still damp, was released from the forming die and dried overnight at room temperature to form an insulator. Alternatively, the preform could be dried in an oven or by using other known drying procedures.

The resulting insulator had the shape of a truncated cone with a circular opening at the top measuring about 5.5 cm in diameter and an elliptical opening on the bottom with diameters of 15 cm by 10 cm. The insulator was about 4.5 cm high and about 8.2 mm thick. The freestanding insulator was pliable (i.e., the insulator could be bent and flexed gently without breaking apart or cracking; a pliable insulator is flexible) and resilient. The insulator had a bulk shrinkage of about 4.5%. The compressibility of the insulator material was tested and the data is shown in Table 1. The values are the average of 3 tests on each sample.

TABLE 1

Compression Force at Various Mount Densities for Example 2

|  | Basis Wt (g/m$^2$) | Mount Density (g/ml) | Gap (cm) | Peak Force (kN/m$^2$) | 15 Sec Force (kN/m$^2$) |
|---|---|---|---|---|---|
| Sample 1 | 1822 | 0.3 | 0.533 | 157 | 78 |
| Sample 2 | 1822 | 0.4 | 0.455 | 322 | 161 |
| Sample 3 | 1822 | 0.5 | 0.363 | 596 | 293 |

Example 3

A preform is prepared from the slurry of Example 2 using a die assembly to form the preform within the outer end cone housing of a double walled end cone on a pollution control device (i.e., the outer end cone housing of the pollution control device). The die assembly for this preform includes a multi-component forming die and a shape-retaining device. The multi-component forming die has an internal skeleton and outer shell. The shape-retaining device is the outer end cone housing for a pollution control device. The multi-component die is similar to that described above for Example 2 except that the outer shell of the multi-component forming die is slightly smaller, in all dimensions, than the inner end cone housing that would be used in the end cone region of a pollution control device. This smaller forming die allows the formation of a preform with the same outer dimensions as the shape-retaining device but with thicker walls than would be produced with a larger forming die. The shape-retaining device is arranged relative to the multi-component forming die such that the slurry can move easily into the space between the shape-retaining device and the forming die when the assembly is submerged into the slurry and a vacuum is pulled in the forming die. When the desired thickness and density for the preform are attained, the vacuum is stopped and the entire assembly is lifted out of the slurry. The preform is inserted into the shape-retaining device while being supported by the forming die. Then, air is blown out of the forming die to release the preform from the die and to force the preform into the shape-retaining device. The preform can be pressure fitted to the shape-retaining device. Pressure fitting can be used to prepare an insulator with clean edges. As the preform is pressed between the forming die and the shape retention device, the ceramic fibers can be sheared at the edge. That is, there are no excess fibers around the ends or edges of the end cone insulator.

The preform can be dried while in the shape-retaining device or after removal from the shape-retaining device. The preform can be dried at room temperature (about 20° C. to about 25° C.) overnight to form an insulator having similar dimensions and appearance to the insulator of Example 2 except that the wall dimensions are thicker. The end cone insulator is freestanding, pliable, and resilient. The increased thickness permits the insulator to be compressed when the pollution control device is assembled, and the insulator can retain some compression to hold it in place during use.

Example 4

A slurry was prepared according to the procedure described in Example 2 except that the composition was 356 liters of water, 5.7 kg of heat treated ceramic fiber, 1.07 kg of latex ("AIRFLEX 600BP" later), 1.2 kg of a 50% solids aqueous solution of active aluminum sulfate, and 90.7 grams of defoamer ("FOAMASTER III" defoamer). On a dry weight basis (i.e. without water), the composition was 82 weight percent heat treated fiber, 8 weight percent latex, 9 weight percent aluminum sulfate, and 1 weight percent defoamer. A preform was prepared according to the procedure described in Example 3 except that the multi-component forming die had approximately the same dimensions as the outside surface of the inner end cone housing in the end cone region of a pollution control device. A shape-retaining device was used as described in Example 3. The preform was likewise air dried overnight to form an insulator.

The appearance and dimensions of the insulator were similar to Example 3 except that the wall thickness of the cone shaped insulator was about 8.2 mm, and the inside dimensions of the insulator were about the same as the outer surface of the inner end cone housing in the end cone region of the pollution control device. The freestanding insulator was pliable and resilient. The bulk shrinkage was about 4.5%, and the compressibility test results are shown in Table 3.

TABLE 2

Compression Force at Various Mount Densities for Example 4

|  | Basis Wt (g/m$^2$) | Mount Density (g/ml) | Gap (cm) | Peak Force (kN/m$^2$) | 15 Sec Force (kN/m$^2$) |
|---|---|---|---|---|---|
| Sample 1 | 1599 | 0.3 | 0.533 | 181 | 88 |
| Sample 2 | 1599 | 0.4 | 0.399 | 358 | 178 |
| Sample 3 | 1599 | 0.5 | 0.320 | 638 | 315 |

Example 5

A slurry containing 96.2 weight percent water, 2.97 weight percent heat treated ceramic fibers (described in Example 1), 0.24 weight percent sodium aluminate, 0.3 weight percent latex ("AIRFLEX 600BP" latex), and 0.3 weight percent of a 50% solids aqueous active aluminum sulfate was prepared in a stainless steel mixing tank with an in-line propeller mixer. The slurry contained about 183.61 (48.5 gallons) of well water. The sodium aluminate was added with the mixer stirring at medium to high speed. The ceramic fibers were slowly added and the mixer speed was increased to the maximum level to keep the fibers dispersed and break up large fiber clumps. After the fibers were dispersed, the latex was added and mixed for about 5 minutes. Then the aluminum sulfate solution was added slowly, and the slurry was mixed for about 10 minutes until it was uniform. An insulator was made according to the procedure in Example 2. The freestanding insulator was pliable, resilient, and had a bulk shrinkage of about 4.5%. The insulating material was tested for compressibility at various mount densities and with various basis weights. The results are shown in Table 3.

TABLE 3

Compression Force at Various Mount Densities for Example 5

|  | Basis Wt (g/m$^2$) | Mount Density (g/ml) | Gap (cm) | Peak Force (kN/m$^2$) | 15 Sec Force (kN/m$^2$) |
|---|---|---|---|---|---|
| Sample 1 | 1807 | 0.2 | 0.904 | 22 | 16 |
| Sample 2 | 1862 | 0.4 | 0.465 | 258 | 157 |
| Sample 3 | 1883 | 0.6 | 0.315 | 824 | 451 |
| Sample 4 | 1827 | 0.8 | 0.229 | 1930 | 1043 |
| Sample 1 | 1807 | 0.4 | 0.452 | 258 | 156 |

TABLE 3-continued

Compression Force at Various Mount Densities for Example 5

|  | Basis Wt (g/m²) | Mount Density (g/ml) | Gap (cm) | Peak Force (kN/m²) | 15 Sec Force (kN/m²) |
|---|---|---|---|---|---|
| Sample 1 | 1807 | 0.6 | 0.302 | 812 | 460 |
| Sample 1 | 1807 | 0.8 | 0.226 | 1785 | 1011 |

The end cone of Example 5 was further evaluated using the Real Condition Fixture Test, and results are shown in Table 4. Pressure was maintained in the gap between the two platens for three heating and cooling cycles.

TABLE 4

RCFT Results for Example 5

| Temperature (° C.) | | Pressure (kN/m²) | | |
|---|---|---|---|---|
| Platen 1 | Platen 2 | Cycle 1 | Cycle 2 | Cycle 3 |
| 25 | 25 | 157.73 | 92.69 | 89.39 |
| 100 | 25 | 134.6 | 90.34 | 86.99 |
| 150 | 30 | 130.91 | 88.74 | 86.08 |
| 200 | 35 | 130.01 | 87.49 | 85.27 |
| 250 | 38 | 123.65 | 86.45 | 83.89 |
| 300 | 40 | 119.43 | 85.41 | 82.94 |
| 350 | 45 | 114 | 82.63 | 80.18 |
| 400 | 50 | 100.02 | 83.11 | 81.59 |
| 450 | 60 | 86.13 | 80.14 | 78.89 |
| 500 | 70 | 83.35 | 82.57 | 78.45 |
| 550 | 85 | 74.44 | 78.45 | 77.76 |
| 600 | 100 | 69.56 | 76.27 | 75.01 |
| 650 | 125 | 62.63 | 68.19 | 69.22 |
| 700 | 150 | 55.75 | 62.9 | 61.64 |
| 750 | 185 | 50.42 | 56.99 | 54.73 |
| 800 | 220 | 41.76 | 49.34 | 48.83 |
| 850 | 325 | 32.73 | 34.41 | 33.76 |
| 900 | 430 | 26.58 | 24.92 | 24.87 |
| 900 | 480 | 22.61 | 21.42 | 21.25 |
| 900 | 530 | 23.75 | 18.11 | 17.8 |
| 900 | 530 | 23.7 | 19.93 | 19.12 |
| 850 | 502 | 27.02 | 22.19 | 21.66 |
| 800 | 474 | 29.92 | 24.81 | 23.15 |
| 750 | 445 | 34.62 | 28.3 | 27.1 |
| 700 | 416 | 38.31 | 30.54 | 29.58 |
| 650 | 387 | 41.57 | 34.54 | 32.68 |
| 600 | 358 | 45.92 | 37.75 | 36.19 |
| 550 | 329 | 49.36 | 40.94 | 38.88 |
| 500 | 300 | 52.79 | 44.87 | 41.62 |
| 450 | 275 | 58.21 | 48.3 | 45.91 |
| 400 | 250 | 60.16 | 50.64 | 48.33 |
| 350 | 215 | 63.71 | 55.2 | 52.86 |
| 300 | 180 | 69.84 | 61.37 | 58.88 |
| 250 | 155 | 73.14 | 64.7 | 62.76 |
| 200 | 130 | 76.75 | 69.35 | 65.74 |
| 150 | 95 | 81.63 | 75.47 | 71.93 |
| 100 | 60 | 86.21 | 81.27 | 78.49 |
| 50 | 50 | 87 | 82.75 | 79.95 |

Example 6

An insulator is prepared according to the procedure in Example 3 except that the fibers used are those available under the trade designation "CER-WOOL HP" from Vesuvius, Buffalo, N.Y. that had been heat treated for 3 minutes at 1060° C. The fibers are described by the supplier as having a composition of 44 to 49 weight percent $Al_2O_3$, 50 to 54 weight percent $SiO_2$, 0 to 0.2 weight percent $Fe_2O_3$, 0 to 0.1 weight percent $TiO_2$, and less than 0.5 weight percent of other materials. The fibers had a bulk shrinkage of 3.2%.

Example 7

An insulator is prepared according to the procedure described in Example 3 except that the fibers used were those available under the trade designation "SNSC" from Shinnika TC (Tokyo, Japan) that were heat treated. The fibers have a composition of about 54 weight percent silica and about 46 weight percent alumina. The fibers were heat treated at 1060° C. and had a bulk shrinkage of 2.6%.

A 28 weight percent $SiO_2$ and 78 weight percent $Al_2O_3$ fiber was obtained under the trade designation "MAFTEC MLS"; and a fiber obtained under the trade designation "SAFFIL" was obtained from Saffil

TABLE 5

Fiber Shrinkage

| Ex | Fiber | Heat treating Time (min) | Bulk Shrinkage (%) |
|---|---|---|---|
| 8 | "KAOWOOL ZR" fiber | 3.5 | 5.2 |
| 9 | "CER-WOOL HTA" fiber | 3 | 7.6 |
| 10 | "KAOWOOL HP" fiber | 3 | 2.6 |
| 11 | "MAFTEC MLS III" fiber | 0 | 1.1 |
| 12 | "SAFFIL LDM" fiber | 0 | 1.3 |

We claim:

1. An end cone insulator comprising (a) ceramic fibers having a bulk shrinkage no greater than 10 percent using the Thermal Mechanical Analyzer test, (b) an organic binder, and (c) no greater than 40 weight percent of an inorganic binder based on a weight of the ceramic fibers, wherein said end cone insulator has a seamless one piece truncated cone-shape that is self-supporting so as to maintain said truncated cone-shape without collapsing or deforming when placed on a flat surface, flexible so that it can be bent and flexed gently without breaking apart or cracking, non-intumescent, and dimensioned with a truncated cone-shape suitable for being disposed between inner and outer cone-shaped metal end cone housings in an end cone region of a pollution control device.

2. The end cone insulator of claim 1, further comprising a cone-shaped metal end cone housing of a pollution control device attached to an inner surface of the end cone insulator, attached to an outer surface of the end cone insulator, or a combination thereof.

3. The end cone insulator of claim 1, wherein the ceramic fibers comprise $Al_2O_3$ in an amount of at least 20 weight percent and $SiO_2$ in an amount of at least 30 weight percent based on the weight of the ceramic fibers.

4. The end cone insulator of claim 3, wherein said end cone insulator has a thickness with a compressibility value no greater than 750 kN/m² when the mount density is about 0.4 g/ml.

5. The end cone insulator of claim 1, wherein the ceramic fibers have a bulk shrinkage no greater than 6 percent.

6. The end cone insulator of claim 1, wherein the ceramic fibers have a bulk shrinkage in the range of 0.5 to 5 percent.

7. The end cone insulator of claim 6, wherein said end cone insulator has a thickness with a compressibility value no greater than 300 kN/m² when the mount density is about 0.4 g/ml.

8. A pollution control device comprising:
a housing comprising an inlet and an outlet, and said inlet comprising an inner cone-shaped metal end cone housing and an outer cone-shaped metal end cone housing defining a gap therebetween;
a pollution control element mounted within said housing;
a mounting mat disposed between said housing and said pollution control element; and
an end cone insulator, according to claim 1, having a thickness and being sandwiched within the gap between said inner and outer cone-shaped metal end cone housings, with the thickness of said end cone insulator having a compressibility value no greater than 750 kN/m$^2$, when the mount density is about 0.4 g/ml, and being in a compressed state while said end cone insulator is sandwiched within the gap at room temperature,
wherein said end cone insulator has a bulk before and a mount density after being sandwiched within the gap, the mount density is greater than the bulk density, and the thickness of said end cone insulator can be further compressed and the mount density increased without the ceramic fibers of said end cone insulator breaking or disintegrating.

9. A pollution control device comprising a housing and an end cone insulator according to claim 1, said housing having an inlet and an outlet, said inlet comprising an inner cone-shaped metal end cone housing and an outer cone-shaped metal end cone housing defining a gap therebetween, and said end cone insulator being sandwiched between said inner and outer cone-shaped metal end cone housings.

10. A pollution control device comprising a housing and an end cone insulator according to claim 4, said housing having an inlet and an outlet, said inlet comprising an inner cone-shaped metal end cone housing and an outer cone-shaped metal end cone housing defining a gap therebetween, and said end cone insulator being sandwiched between said inner and outer cone-shaped metal end cone housings.

11. A method of making an end cone insulator according to claim 1, said method comprising:
preparing an aqueous slurry comprising (a) ceramic fibers having a bulk shrinkage no greater than 10 percent using the Thermal Mechanical Analyzer test, (b) an organic binder, and (c) no greater than 40 weight percent of an inorganic binder based on a weight of the ceramic fibers;
vacuum forming a seamless one piece truncated cone-shaped preform from the aqueous slurry on a permeable forming cone-shaped die;
drying the preform to produce an end cone insulator,
wherein the end cone insulator has a seamless one piece truncated cone-shape that is being self-supporting so as to maintain the truncated cone-shape without collapsing or deforming when placed on a flat surface, flexible so that it can be bent and flexed gently without breaking apart or cracking, non-intumescent, and dimensioned with a truncated cone-shape suitable for being disposed between inner and outer cone-shaped metal end cone housings in an end cone region of a pollution control device.

12. The method of claim 11, wherein said vacuum forming further comprises:
inserting the preform into or onto a cone-shaped shape-retaining device while the preform is supported by the permeable forming cone-shaped die,
transferring the preform to the cone-shaped shape-retaining device, and
removing the permeable forming cone-shaped die.

13. The method of claim 12, wherein the shape-retaining device is an inner cone-shaped metal end cone housing or an outer cone-shaped metal end cone housing of an end cone region of a pollution control device.

14. The method of claim 13, wherein the end cone insulator is attached to the end cone housing.

15. The method of claim 11, wherein the ceramic fibers are microcrystalline, crystalline, or a combination thereof, and the end cone insulator has a thickness with a compressibility value no greater than 750 kN/m$^2$ when the mount density is about 0.4 g/ml.

16. The method of claim 11, wherein the ceramic fibers comprise $Al_2O_3$ in an amount of at least 20 weight percent and $SiO_2$ in an amount of at least 30 weight percent based on the weight of the ceramic fibers.

17. The method of claim 11, wherein the slurry comprises up to 20 weight percent of the organic binder based on the weight of the end cone insulator.

18. A method of making a pollution control device having an end cone region comprising inner and outer cone-shaped metal end cone housings, said method comprising:
disposing an end cone insulator between the inner and outer cone-shaped metal end cone housings of the pollution control device, where the end cone insulator is made according to the method of claim 11.

19. A pollution control device comprising:
a housing comprising an inlet and an outlet, and said inlet comprising an inner cone-shaped metal end cone housing and an outer cone-shaped metal end cone housing defining a gap therebetween;
a pollution control element mounted within said housing;
a mounting mat disposed between said housing and said pollution control element; and
an end cone insulator, according to claim 1, having a thickness and being sandwiched within the gap between said inner and outer cone-shaped metal end cone housings, with the thickness of said end cone insulator having a compressibility value no greater than 300 kN/m$^2$, when the mount density is about 0.4 g/ml, and being in a compressed state while said end cone insulator is sandwiched within the gap at room temperature,
wherein said end cone insulator has a bulk density in the range of 0.1 to 0.4 g/ml before being sandwiched within the gap and a mount density after being sandwiched within the gap that is greater than the bulk density, and the thickness of said end cone insulator can be further compressed and the mount density increased without the ceramic fibers of said end cone insulator breaking or disintegrating.

20. An end cone insulator comprising (a) ceramic fibers having a bulk shrinkage no greater than 10 percent using the Thermal Mechanical Analyzer test, and (b) a binder, with no greater than 40 weight percent of an inorganic binder based on a weight of the ceramic fibers, wherein said end cone insulator has a seamless one piece truncated cone-shape that is self-supporting so as to maintain said truncated cone-shape without collapsing or deforming when placed on a flat surface, flexible so that it can be bent and flexed gently without breaking apart or cracking, non-intumescent, and dimensioned with a truncated cone-shape suitable for being disposed between inner and outer cone-shaped metal end cone housings in an end cone region of a pollution control device.

* * * * *

UNITED STATES PATENT AND TRADEMARK OFFICE
CERTIFICATE OF CORRECTION

PATENT NO. : 8,652,599 B2  Page 1 of 1
APPLICATION NO. : 10/540242
DATED : February 18, 2014
INVENTOR(S) : Carl J. Braunreiter et al.

It is certified that error appears in the above-identified patent and that said Letters Patent is hereby corrected as shown below:

In the Specification:

Col. 4, line 13, delete "TVA" and insert -- TMA --

Col. 4, line 59, delete ""UNIF" and insert -- "UNIFRAX --

Col. 6, line 20, delete "HTz"" and insert -- HTZ" --

Col. 8, line 10, delete "g/mil." and insert -- g/ml. --

Col. 18, line 32, delete "defoaamer." and insert -- defoamer. --

Col. 19, line 65, delete "later)," and insert -- latex), --

Signed and Sealed this
Twenty-fourth Day of June, 2014

Michelle K. Lee
*Deputy Director of the United States Patent and Trademark Office*